(12) United States Patent
Harty, Sr. et al.

(10) Patent No.: US 9,549,530 B2
(45) Date of Patent: Jan. 24, 2017

(54) MILKING APPARATUS AND A METHOD FOR PRESENTING A TEAT CUP FOR ATTACHING TO AN ANIMAL

(75) Inventors: Edmond Patrick Harty, Sr., Causeway (IE); Edmond Patrick Harty, Jr., Causeway (IE); John Harty, Causeway (IE)

(73) Assignee: DAIRYMASTER, Causeway (IE)

( * ) Notice: Subject to any disclaimer, the term of this patent is extended or adjusted under 35 U.S.C. 154(b) by 1048 days.

(21) Appl. No.: 13/578,089

(22) PCT Filed: Feb. 9, 2011

(86) PCT No.: PCT/IE2011/000009
§ 371 (c)(1),
(2), (4) Date: Jan. 23, 2013

(87) PCT Pub. No.: WO2011/098994
PCT Pub. Date: Aug. 18, 2011

(65) Prior Publication Data
US 2013/0112142 A1    May 9, 2013

(30) Foreign Application Priority Data

Feb. 10, 2010   (IE) .................................. S2010/0071

(51) Int. Cl.
*A01J 7/00*       (2006.01)
*A01J 5/017*      (2006.01)
(Continued)

(52) U.S. Cl.
CPC ....... *A01J 7/00* (2013.01); *A01J 5/003* (2013.01); *A01J 5/0175* (2013.01); *A01J 7/025* (2013.01); *A01J 7/04* (2013.01); *A01K 1/126* (2013.01)

(58) Field of Classification Search
CPC ............ A01J 5/0175; A01J 5/007; A01J 7/02; A01J 7/025; A01K 1/12; A01K 1/126
(Continued)

(56) References Cited

U.S. PATENT DOCUMENTS 3,752,122 A * 8/1973 Ciribelli ................. A01K 1/126
                                                       119/14.04
4,010,714 A * 3/1977 Notsuki ............... A01K 1/0613
                                                       119/14.03
(Continued)

FOREIGN PATENT DOCUMENTS

DE       102006046767 A1     4/2008
DE       102006051362 A1     4/2008
(Continued)

OTHER PUBLICATIONS

International Search REport for PCT/IE2011/000009 dated Oct. 17, 2011.

*Primary Examiner* — Yvonne Abbott-Lewis
(74) *Attorney, Agent, or Firm* — Sughrue Mion, PLLC

(57) ABSTRACT

A rotary milking platform (1) comprises a plurality of apparatus, each of which comprises a platform (11) which forms a segment of the rotary platform (1). The platforms (11) define respective animal accommodating locations (3) for animals to be milked. A communicating opening (20) in each platform (11) is closed by a pair of closure plates (25) which are pivotal upwardly into an open state for separating the hind legs of an animal. A carriage (14) which is slideably carried beneath the platform (11) of each apparatus (10) in the directions of the arrows A and B. A teat cup carrier (15) is pivotally mounted in the carriage (14) of each apparatus (10) and is pivotal from a first state with teat cups (16) in the carrier (15) in a protective state extending horizontally and a second state with the teat cups (16) in a ready state extending vertically upwardly and ready for manual place- (Continued)

ment onto the teats of an animal. The carriage (14) is urgeable into a first position with the teat cup carrier (15) in the first state and with the teat cups (16) sealably engaged in plug elements (45) which include jetters (47) for use in rinsing and washing the milking system. The carriage (14) is moveable from the first position to a second position with the teat cup carrier (15) substantially aligned with the udder of an animal so that when the teat cup carrier (15) is urged into the second state, the teat cups (16) can be manually urged upwardly by hand and attached to the teat of the animal.

33 Claims, 9 Drawing Sheets

(51) Int. Cl.
 *A01J 7/02* (2006.01)
 *A01J 7/04* (2006.01)
 *A01K 1/12* (2006.01)
 *A01J 5/003* (2006.01)

(58) Field of Classification Search
 USPC ............ 119/14.02, 14.03, 14.04, 14.08, 14.1
 See application file for complete search history.

(56) References Cited

U.S. PATENT DOCUMENTS

| | | | | | |
|---|---|---|---|---|---|
| 4,207,837 | A | * | 6/1980 | Schwartau | A01K 1/12 119/14.03 |
| 4,441,455 | A | * | 4/1984 | Lowry | A01J 5/08 119/14.47 |
| 4,805,559 | A | * | 2/1989 | Van der Lely | A01J 5/0175 119/14.1 |
| 4,867,103 | A | * | 9/1989 | Montalescot | A01K 1/12 119/14.08 |
| 5,606,932 | A | * | 3/1997 | van der Lely | A01J 5/007 119/14.14 |
| 8,800,486 | B2 | * | 8/2014 | Daniel | A01J 5/007 119/14.02 |
| 8,863,687 | B2 | * | 10/2014 | Andersson | A01J 5/0175 119/14.04 |
| 2008/0173243 | A1 | | 7/2008 | Dreyer et al. | |
| 2014/0041591 | A1 | * | 2/2014 | Krone | A01J 5/0175 119/14.02 |

FOREIGN PATENT DOCUMENTS

| | | |
|---|---|---|
| DE | 102007004539 A1 | 7/2008 |
| EP | 0322404 A2 | 6/1989 |
| EP | 0811319 A1 | 12/1997 |
| EP | 1616483 A1 | 1/2006 |
| WO | 2006073368 A1 | 7/2006 |
| WO | 2010052156 A1 | 5/2010 |

* cited by examiner

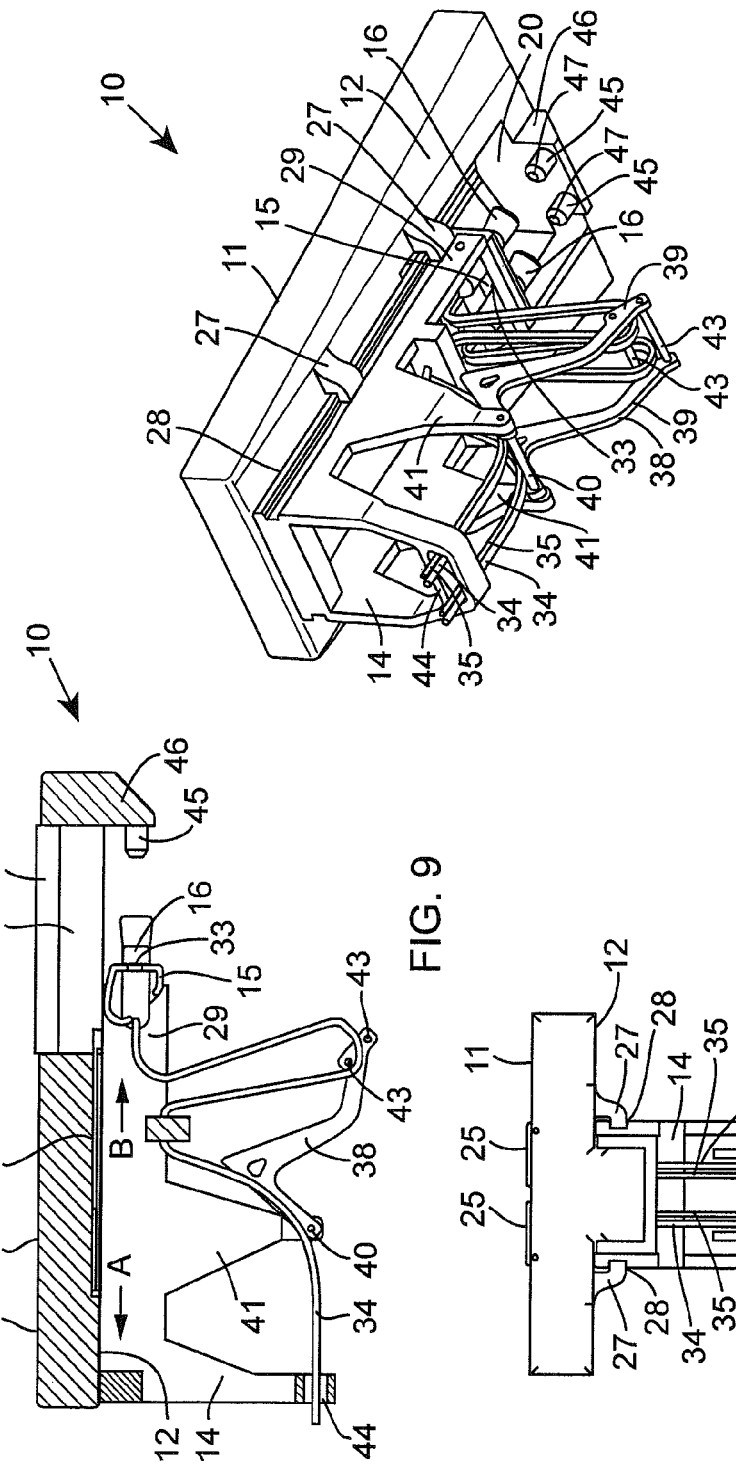

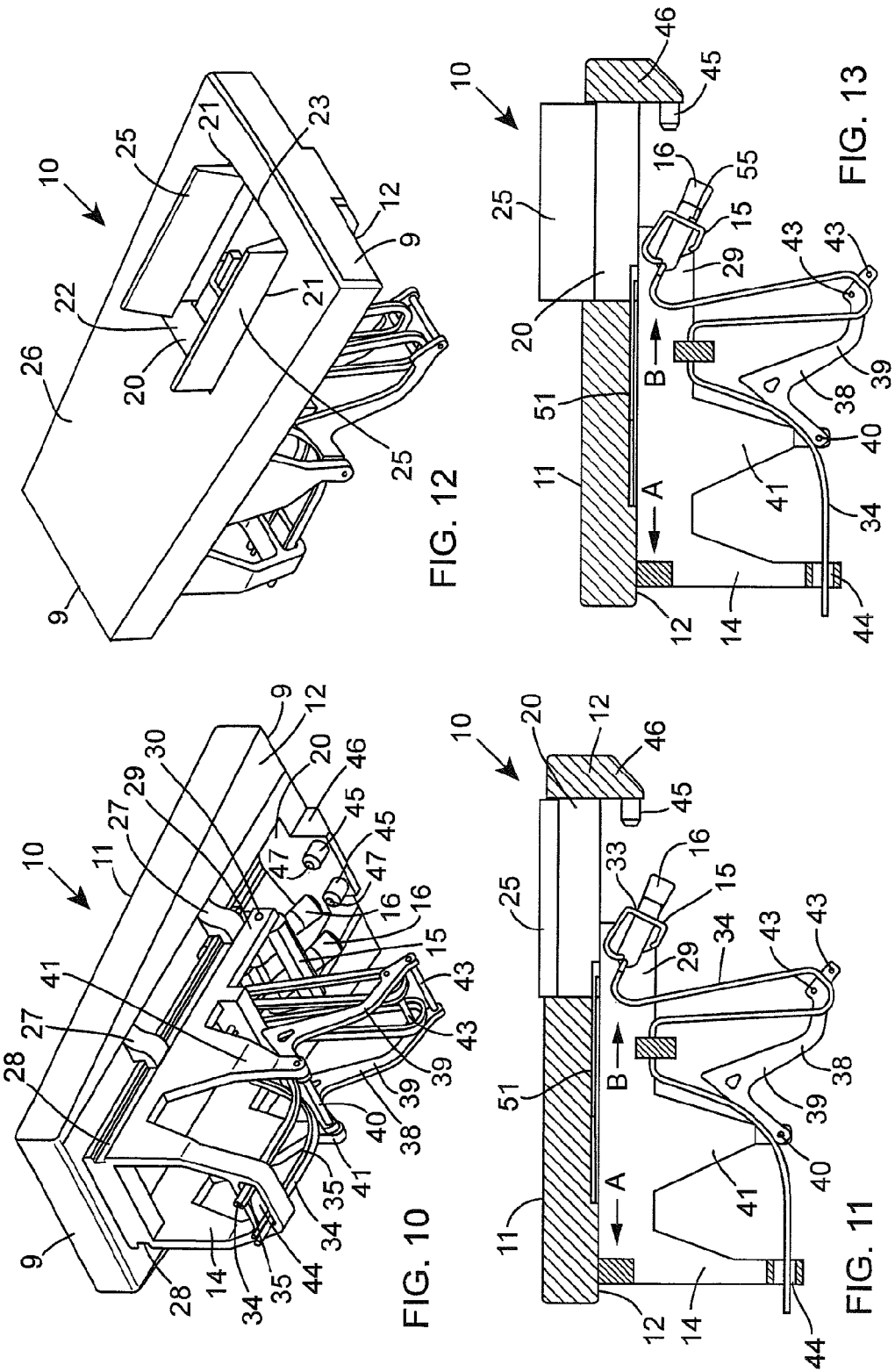

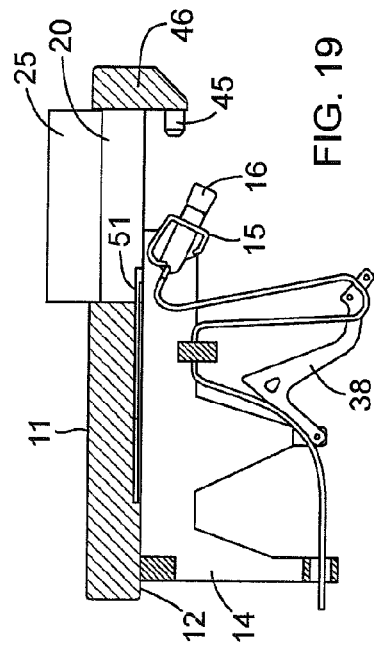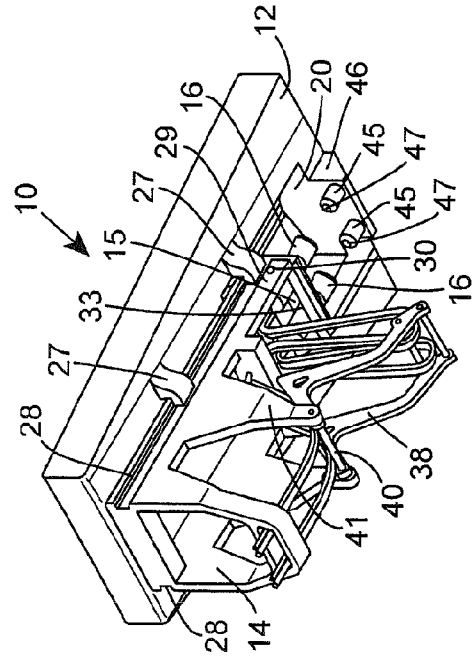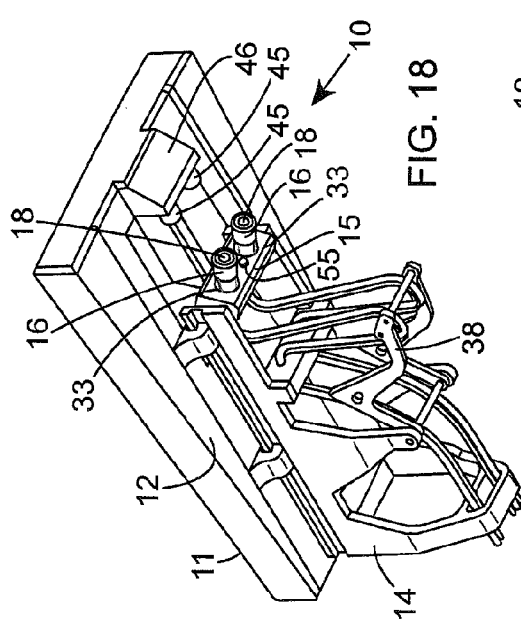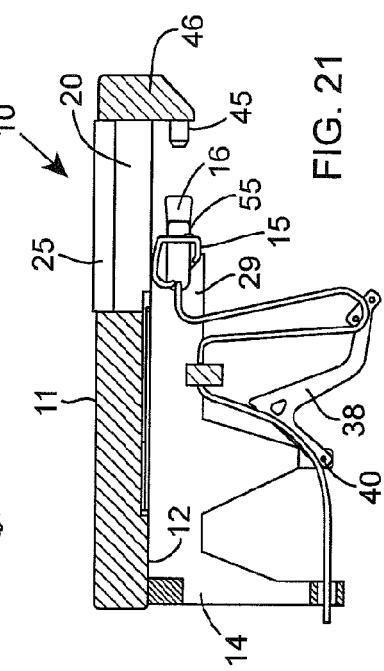

MILKING APPARATUS AND A METHOD FOR PRESENTING A TEAT CUP FOR ATTACHING TO AN ANIMAL

BACKGROUND OF THE INVENTION

The present invention relates to a milking apparatus, and in particular the invention relates to apparatus for presenting a teat cup for attaching to a teat of an animal to be milked, and the invention also relates to a method for presenting a teat cup for attaching to a teat of an animal to be milked. The invention also relates to a rotary milking platform and a rotary milking parlour.

Rotary milking parlours are known. Such rotary milking parlours comprise a rotary milking platform which is rotated during milking of the animals. A plurality of animal accommodating locations are provided side by side circumferentially around and adjacent the periphery of the rotary milking platform for accommodating the animals during milking. Ideally the rotational speed of the rotary milking platform is set so that the time taken for one complete revolution of the platform is sufficient to allow milking of a typical animal, and also to allow sufficient time for attaching of teat cups of a milking system to the teats of the animal, and the subsequent removal of the teat cups therefrom. Thus, with the rotational speed of the rotary milking platform so set, on completion of one revolution of the rotary platform, milking of the animal should have been completed, the teat cups should have been removed from the animal and the animal should be just ready to exit the rotary platform.

If the rotational speed of the rotary milking platform is too great, milking of the animal will not have been completed or the teat cups will not have been removed from the animal by the time the platform has made one complete revolution. On the other hand, if the rotational speed of the platform is too slow, the animals will have to remain on the rotary platform for a longer period than is necessary. Both problems of a rotary milking platform operating at too high a speed or too low a speed lead to inefficiency in milking.

Efficiency in the operation of a rotary milking platform could be achieved by increasing the rotational speed of the platform, provided of course that at the end of one complete revolution of the rotary platform, milking of the animal due to exit the rotary platform had been completed, and the teat cups had been removed from the animal. Since it is virtually impossible to reduce the milking time of an animal, the areas where improved efficiency could be achieved are in the attaching and removal of the teat cups.

There is therefore a need for apparatus for presenting teat cups for attaching to the teats of an animal for facilitating efficient attaching and removal of the teat cups to and from the animal. There is also a need for a rotary milking platform which comprises such apparatus, and further, there is a need for a milking parlour generally, be it rotary or otherwise, in which the attaching and removal of teat cups to and from the teats of an animal may be carried out efficiently and in the shortest possible time.

The present invention is directed towards providing apparatus for presenting a teat cup for attaching to a teat of an animal for milking thereof. The invention is also directed towards providing a milking parlour comprising such apparatus, and the invention is also directed towards providing a rotary milking platform with such apparatus. Further the invention is directed towards providing a method for presenting a teat cup for attaching to a teat of an animal for milking thereof.

SUMMARY OF THE INVENTION

According to the invention there is provided apparatus for presenting a teat cup for attaching to a teat of an animal to be milked, the apparatus comprising a support means adapted for mounting beneath an upwardly facing major surface of a platform on which an animal stands during milking thereof, and a teat cup carrier for holding the teat cup, the teat cup carrier being mounted on the support means and being adapted for holding the teat cup beneath the animal in a ready state with the teat cup ready to be urged upwardly from the teat cup carrier for attaching to the teat of the animal.

Preferably, the teat cup carrier is located beneath the upwardly facing major surface of the platform. Ideally, the teat cup carrier is adapted for holding the teat cup in the ready state with at least a portion of the teat cup extending above the upwardly facing major surface of the platform.

Advantageously, the teat cup carrier is selectively operable in a first state for holding the teat cup in a protected state, and in a second state for holding the teat cup in the ready state.

In one embodiment of the invention the teat cup carrier is adapted for holding the teat cup in the protected state with the teat cup beneath the upwardly facing major surface of the platform.

In another embodiment of the invention the teat cup carrier is selectively operable in a third state with the teat cup in a flushing state for facilitating back flushing of the teat cup. Preferably, the teat cup carrier is adapted for holding the teat cup in the flushing state beneath the upwardly facing major surface of the platform. Advantageously, the teat cup carrier is adapted to hold the teat cup in the flushing state inclined downwardly towards an open mouth of the teat cup when the teat cup carrier is in the third state.

In another embodiment of the invention the teat cup carrier is adapted to hold the teat cup in the protected state with the teat cup extending substantially horizontally when the teat cup carrier is in the first state.

In another embodiment of the invention the teat cup carrier is adapted to hold the teat cup in the ready state with the teat cup extending substantially vertically and with the open mouth of the teat cup facing generally upwardly when the teat cup carrier is in the second state.

Preferably, a first drive means is provided for operating the teat cup carrier between the first, second and third states.

In another embodiment of the invention the apparatus comprises the platform.

Advantageously, the support means is mounted on and beneath the platform.

In one embodiment of the invention the platform defines a centre line extending substantially in a forward/rearward direction corresponding to a forward/rearward direction of an animal standing on the platform during milking.

In another embodiment of the invention a communicating opening is formed in the platform for accommodating the teat cup therethrough from the teat cup carrier in the second state.

Preferably, the communicating opening is located in the platform on the centre line. Advantageously, the centre line bisects the communicating opening. Ideally, the communicating opening is provided in the platform at a location which is substantially beneath an udder of an animal standing on the platform to be milked. Preferably, the communicating opening is substantially aligned with the udder of an animal standing on the platform to be milked. Preferably, the communicating opening defines a pair of opposite side edges extending substantially parallel to the centre line of the platform.

Advantageously, a closure element is provided for closing the communicating opening. Preferably, a pair of closure elements is provided for closing the communicating opening, the closure elements being coupled to the platform adjacent the respective opposite side edges of the communicating opening. Ideally, the closure elements are urgeable upwardly from a closed state closing the communicating opening to an open state providing access through the communicating opening to the teat cup. Advantageously, the closure elements extend from the respective opposite side edges towards each other in the closed state and meet adjacent the centre line of the platform. Ideally, the closure elements are hingedly coupled to the platform, and are hingeable between the closed and open states. Preferably, each closure element is spring biased from the open state to the closed state.

In one embodiment of the invention a second drive means is provided for urging the closure elements from the closed state to the open state.

Preferably, the closure elements form a separating means for urging the hind legs of an animal apart as the closure elements are being urged from the closed state to the open state.

In another embodiment of the invention a closure means is provided for closing the open mouth of the teat cup when the teat cup carrier is in the first state and the teat cup is in the protected state. Preferably, the closure means comprises a plug element for sealably engaging the open mouth of the teat cup. Advantageously, the closure means is configured as a jetter for facilitating washing and/or rinsing of the teat cup.

In one embodiment of the invention one of the teat cup carrier and the closure means is moveable relative to the other of the teat cup carrier and the closure means between an engaged position with the closure means engaged in the open mouth of the teat cup, and a disengaged position with the closure means disengaged from the teat cup. Preferably, the teat cup carrier is moveable between the engaged position and the disengaged position.

In another embodiment of the invention the teat cup carrier is mounted on a carriage which is mounted on the support means, the carriage being moveable relative to the support means between a first position with the teat cup carrier in the engaged position and a second position with the teat cup carrier in the disengaged position. Advantageously, the carriage is slideably mounted on the support means between the first and second positions. Preferably, the carriage is slideable between the first and second positions with rectilinear motion. Advantageously, the carriage is moveable in a substantially horizontal plane between the first and second positions. Preferably, the carriage is moveable in a direction substantially parallel to the centre line defined by the platform between the first and second positions.

In another embodiment of the invention a third drive means is provided for urging the carriage between the first position and the second position.

In one embodiment of the invention the teat cup carrier is moveably mounted on the carriage and is moveable relative to the carriage between the first, second and third states. Preferably, the teat cup carrier is pivotally mounted on the carriage, and is pivotal between the first, second and third states. Advantageously, when the carriage is in the second position and the teat cup carrier is in the second state with the teat cup in the ready state, the teat cup is substantially aligned with a teat of an animal.

In another embodiment of the invention an urging means is provided for urging the teat cup from a teat of an animal for removing the teat cup from the teat of the animal. Preferably, the urging means is adapted for returning the teat cup to the teat cup carrier when the teat cup carrier is in the second state.

In another embodiment of the invention the teat cup carrier is adapted to accommodate a vacuum hose therethrough extending from the teat cup, so that the vacuum hose can be pulled through the teat cup carrier when the teat cup is being urged from the teat cup carrier to an animal.

In one embodiment of the invention the urging means is mounted on one of the support means and the carriage and is engageable with the vacuum hose extending from the teat cup for urging the teat cup from a teat of an animal. Preferably, the urging means is pivotally mounted on the one of the support means and the carriage and is pivotal from a first state to a second state for urging the teat cup from a teat of an animal. Advantageously, the urging means is adapted so that in the second state the urging means takes up slack in the vacuum hose extending from the teat cup when the teat cup is engaged in the teat cup carrier.

In one embodiment of the invention a fourth drive means is provided for operating the urging means from the first state to the second state.

In another embodiment of the invention a spray nozzle is provided for spraying at least one teat of an animal. Preferably, the spray nozzle is mounted on the teat cup carrier. Advantageously, the spray nozzle is adapted to direct a spray at the teat of an animal when the teat cup carrier is in the second state.

In another embodiment of the invention the platform comprises a support plate, the support plate being adapted to receive concrete to define the upwardly facing major surface of the platform.

In one embodiment of the invention the teat cup carrier is adapted to hold the teat cup for facilitating manual transfer of the teat cup from the teat cup carrier to the teat of the animal.

In another embodiment of the invention the teat cup carrier is adapted to hold two teat cups.

In a further embodiment of the invention the teat cup carrier is adapted to hold four teat cups.

In a still further embodiment of the invention the teat cup carrier is adapted to hold a number of teat cups corresponding to the number of teats of the animal being milked.

Preferably, one closure means is provided corresponding to each teat cup.

The invention also provides a rotary milking platform comprising the apparatus according to the invention.

Preferably, the rotary milking platform defines a plurality of animal accommodating locations circumferentially disposed around the rotary platform. Advantageously, the animal accommodating locations are located towards a circumferential periphery of the rotary platform. Preferably, each animal accommodating location is adapted to accommodate an animal standing thereon during milking with the rear end of the animal adjacent the circumferential periphery and the head of the animal facing inwardly towards a centre of the rotary platform. Advantageously, one apparatus is provided in each animal accommodating location of the rotary platform.

Preferably, each apparatus is located beneath the rotary platform adjacent the corresponding animal accommodating location. Advantageously, each apparatus is located towards the circumferential periphery of the rotary platform. Ideally, each apparatus is located so that the teat cup carrier in the second state presents the teat cup in the ready state substantially aligned with the udder of an animal standing on the platform to be milked in the corresponding animal accommodating location.

Preferably, the communicating opening is located in the platform in each animal accommodating location towards the circumferential periphery of the rotary platform. Advantageously, the communicating opening is located in the platform in each animal accommodating location substantially aligned with the udder of an animal standing on the platform to be milked in the corresponding animal accommodating location.

The invention also provides a rotary milking parlour comprising the apparatus according to the invention.

Further the invention provides a method for presenting a teat cup for attaching to a teat of an animal to be milked, the method comprising supporting the teat cup on a teat cup carrier mounted beneath an upwardly facing major surface of a platform on which an animal stands during milking, and providing a communicating opening in the platform, so that the teat cup can be urged through the communicating opening from the teat cup carrier for attaching to the teat of the animal to be milked.

In one embodiment of the invention a closure element is provided for closing the communicating opening. Preferably, a pair of closure elements are provided for closing the communicating opening, the closure elements being adapted for urging the hind legs of animal apart. Advantageously, the closure elements are urgeable from a closed state closing the communicating opening to an open state for accommodating the teat cup through the communicating opening, and for urging the hind legs of an animal apart.

In another embodiment of the invention the teat cup is held by the teat cup carrier for facilitating manual transfer of the teat cup from the teat cup carrier to a teat of an animal.

In a further embodiment of the invention the teat cup carrier is located beneath the upwardly facing major surface of the platform. Preferably, the teat cup carrier is adapted for holding the teat cup in the ready state with at least a portion of the teat cup extending above the upwardly facing major surface of the platform.

Preferably, the teat cup carrier is selectively operable in a first state for holding the teat cup in a protected state, and in a second state for holding the teat cup in the ready state, and the teat cup carrier with the teat cup carried therein is urged from the first state to the second state to present the cup in the ready state. Advantageously, the teat cup carrier is adapted for holding the teat cup in the protected state and in the ready state beneath the upwardly facing major surface of the platform.

In another embodiment of the invention the teat cup carrier is selectively operable in a third state with the teat cup in a flushing state for facilitating back flushing of the teat cup, and the teat cup carrier is urged into the third state with the teat cup carried therein on completion of milking of an animal for back flushing the teat cup.

In another embodiment of the invention the teat cup carrier is adapted to hold the teat cup in the ready state with the teat cup extending substantially vertically and the open mouth of the teat cup facing in a general upward direction when the teat cup carrier is in the second state.

In one embodiment of the invention the teat cup carrier is urged into the disengaged position and the second state with the teat cup in the ready state and substantially aligned with a teat of an animal. Preferably, the teat cup carrier is moveable in a substantially horizontal plane between the engaged position and the disengaged position.

In one embodiment of the invention the teat cup is urged from a teat of an animal by urging the vacuum hose through the teat cup carrier.

Preferably, a spray nozzle is provided for spraying at least one teat of an animal. Advantageously, the at least one teat of an animal is sprayed by urging a liquid through the spray nozzle when the teat cup carrier is in the second state.

BRIEF DESCRIPTION OF THE DRAWINGS

The invention will be more clearly understood from the following description of a preferred embodiment thereof, which is given by way of example only, with reference to the accompanying drawings, in which:

FIG. 6 is an end elevational view of the apparatus of FIG. 2, FIG. 8 is an underneath perspective view of the apparatus of FIG. 2 illustrated with a portion of the apparatus in a different position to that of FIGS. 2 to 7, FIG. 9 is a view similar to FIG. 7 of the apparatus of FIG. 2 in the state of FIG. 8, FIG. 10 is an underneath perspective view of the apparatus of FIG. 2 in a different state to that of FIG. 2, FIG. 11 is a view similar to FIG. 7 of the apparatus of FIG. 2 in the state of FIG. 10, FIG. 12 is a top perspective view of the apparatus of FIG. 2 illustrating the apparatus of FIG. 2 in a different state to that of FIG. 2, FIG. 13 is a view similar to FIG. 7 of the apparatus of FIG. 2 in the state of FIG. 12, FIG. 18 is an underneath perspective view of the apparatus of FIG. 2 in a different state to that of FIG. 2, FIG. 19 is a view similar to FIG. 7 of the apparatus of FIG. 2 illustrating the apparatus in the state of FIG. 18, FIG. 20 is an underneath perspective view of the apparatus of FIG. 2 in a further different state to that of FIG. 2, FIG. 21 is a view similar to FIG. 7 of the apparatus of FIG. 2 in the state of FIG. 20.

DETAILED DESCRIPTION OF THE INVENTION

Figure 1:
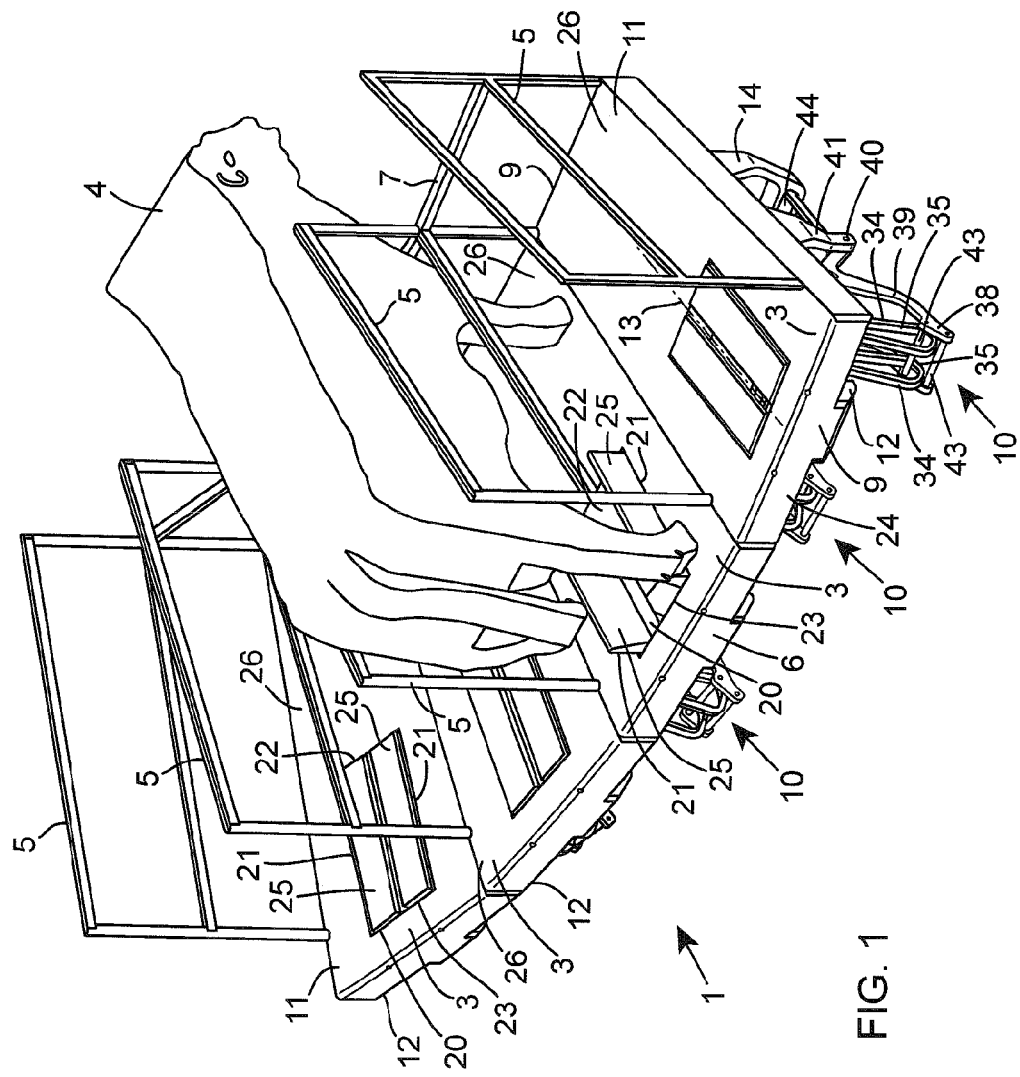
FIG. 1 is a perspective view of a portion of a rotary milking platform according to the invention.
Figure 2:
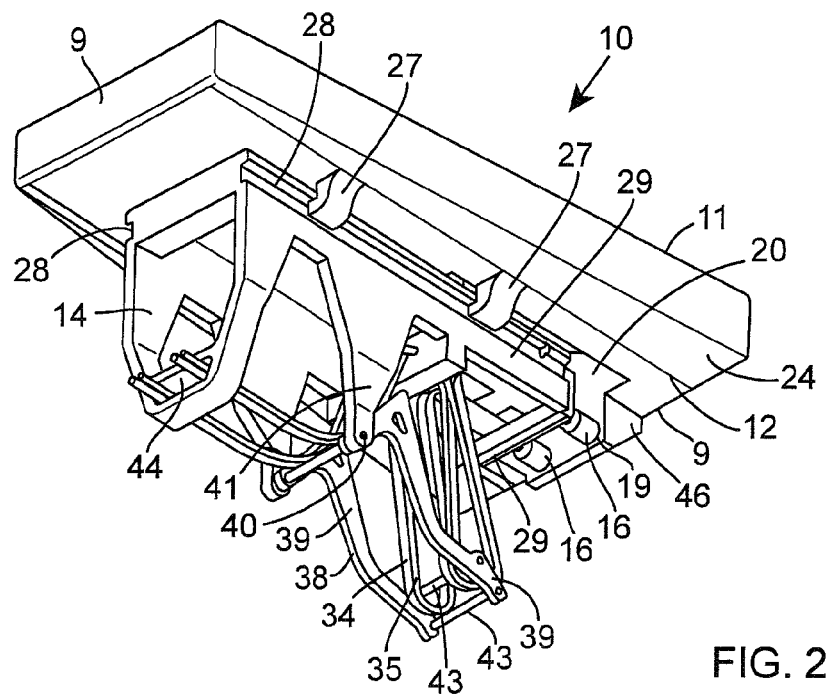
FIG. 2 is an underneath perspective view of apparatus also according to the invention of the rotary milking platform of FIG. 1 for presenting teat cups for attaching to teats of an animal to be milked.
Figure 3:
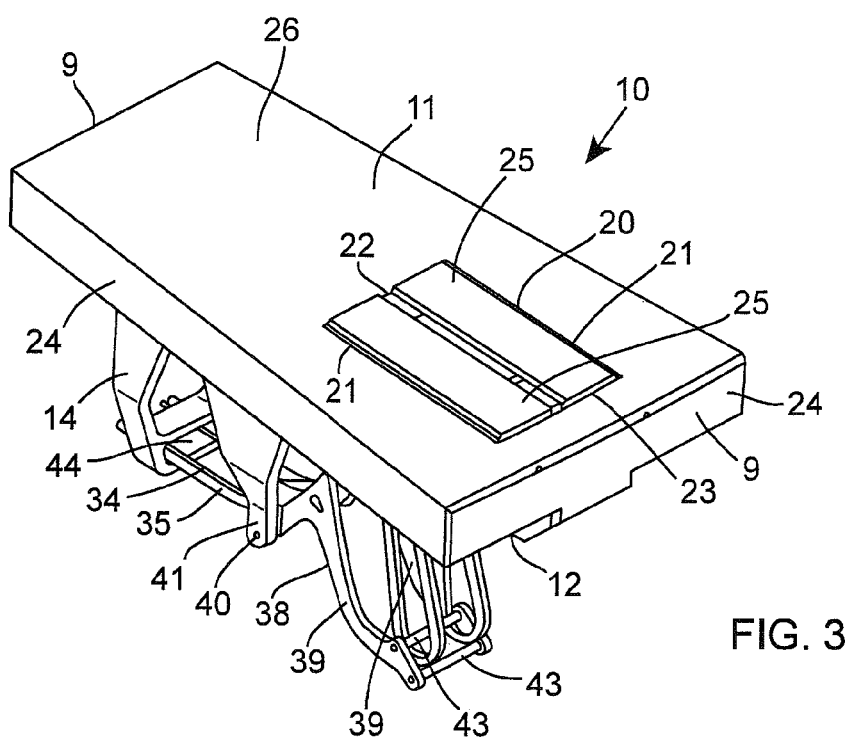
FIG. 3 is a top perspective view of the apparatus of FIG. 2.

Referring to the drawings, and in particular to FIG. 1, there is illustrated a portion of a rotary milking platform according to the invention, indicated generally by the reference numeral 1, of a rotary milking parlour (not shown) also according to the invention. Such rotary milking parlours will be well known to those skilled in the art, and a description of the rotary milking parlour should not be required. In this embodiment of the invention the rotary milking parlour is suitable for milking goats.

The rotary milking platform 1 comprises a circular platform 2 which defines a plurality of animal accommodating locations 3 for accommodating animals 4, only one of which animals is illustrated in FIG. 1, during milking. The animal accommodating locations 3 are disposed side by side circumferentially around a circumferential periphery 6 of the platform 2 and are defined by radially extending barriers 5. The animal accommodating locations 3 are adapted to accommodate the animals 4 with the head of the animal facing radially inwardly towards the centre (not shown) of the platform 2 and the rear of the animal 4 adjacent the circumferential periphery 6 of the platform 2. Thus, the animals when in the animal accommodating locations 3 extend in a general radial direction from their head to their rear with the head of the animal pointing towards the geometrical centre of the platform 2. Inner barriers 7 extending between respective pairs of the radial barriers 5 locates the animals 4 in the animal accommodating locations 3.

Figure 4:
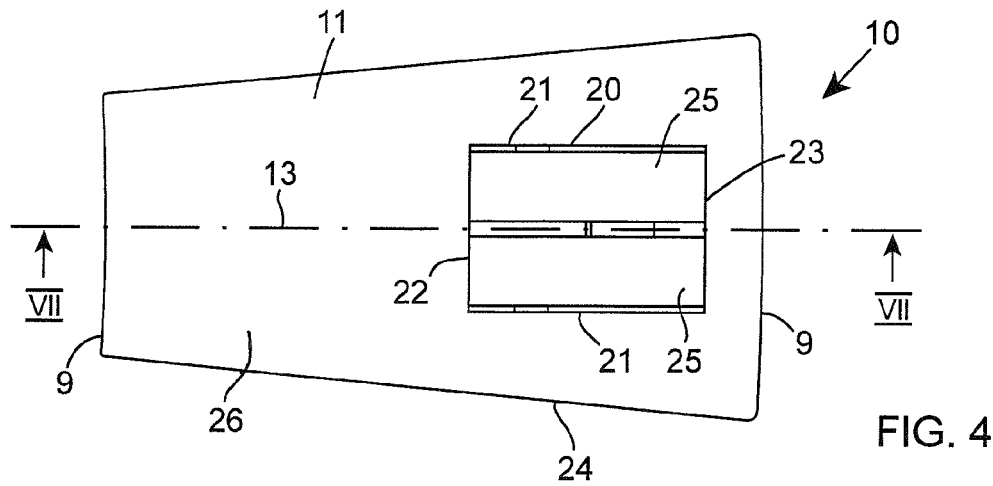
FIG. 4 is a top plan view of the apparatus of FIG. 2.
Figure 5:
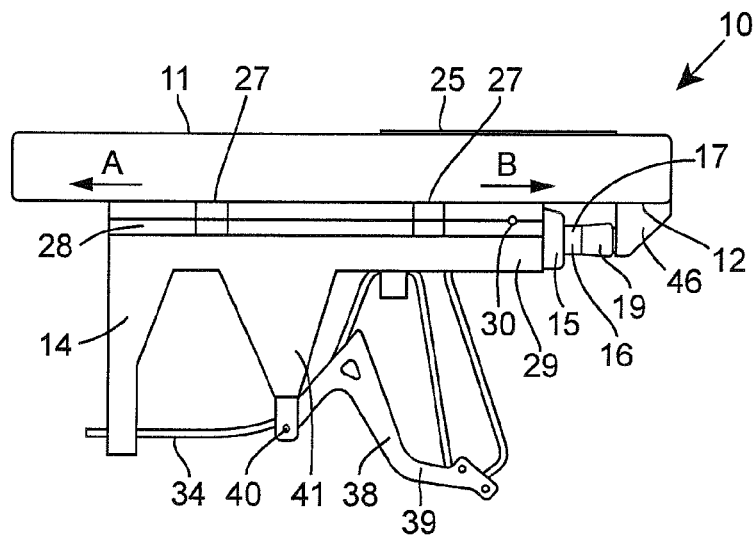
FIG. 5 is a side elevational view of the apparatus of FIG. 2.
Figure 15:
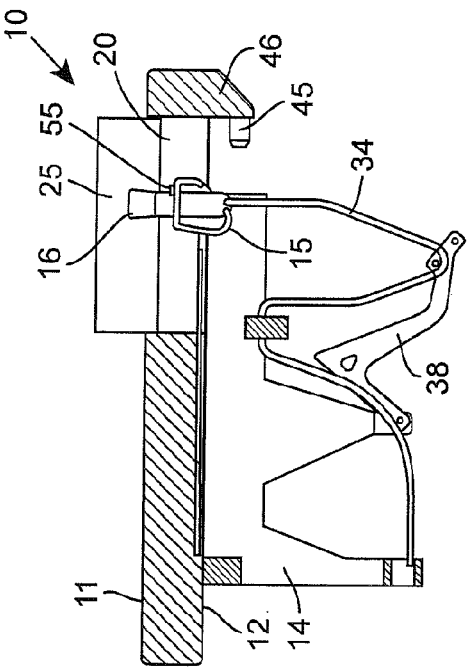
FIG. 15 is a top plan view of the apparatus of FIG. 2 in the state of FIG. 14.

A plurality of apparatus also according to the invention, indicated generally by the reference numeral 10, are located beneath the rotary milking platform 1 adjacent the respective animal accommodating locations 3 for presenting teat cups 16 for attaching to the teats of animals in the respective corresponding animal accommodating locations 3 for milking of the animals. Each apparatus 10 comprises a platform 11, and each platform 11 forms a portion of the platform 2 and defines with adjacent ones of the barriers 5 and the inner barrier 7 the corresponding animal accommodating location 3. The platform 11 of each apparatus 10 defines a centre line 13 of the corresponding animal accommodating location 3, which extends in a general radial direction relative to the rotary milking platform 1 and in the general forward rearward direction of the corresponding animal 4, see FIGS. 4 and 15. It will be appreciated that while in this embodiment of the invention each apparatus 10 also includes a platform 11, this is not essential. The platform 2 may be formed by a single circular plate, and each apparatus 10 without the corresponding platform 11 would be secured to the single circular plate beneath the circular plate.

Referring now to FIGS. 2 to 25, the platform 11 of each apparatus 10 comprises a support plate 12 having upwardly extending opposite end walls 9 which form with the support plate 12 a tray 24 for receiving concrete to form with the support plate and the end walls the platform 11. The platform 11 defines an upwardly facing major surface 26 on which the animal stands during milking.

A support means comprising four mounting brackets 27 secured to and extending downwardly from the support plate 12 of each apparatus 10 slideably carry a carriage 14 of steel below the support plate 12. As will be described in more detail below, the carriage 14 of each apparatus 10 is slideable radially on the mounting brackets 27 relative to the rotary milking platform 1 in the directions of the arrows A and B. A teat cup carrier 15 of steel for holding the teat cups 16 is pivotally mounted on the carriage 14 of each apparatus 10. In this embodiment of the invention since the rotary milking platform 1 is suitable for milking goats, the teat cup carrier 15 of each apparatus 10 is adapted to carry two teat cups 16, one for each teat of the corresponding goat to be milked. However, the rotary milking platform 1 may be adapted for milking cows or other animals. When adapted for milking cows each teat cup carrier 15 would be adapted to hold four teat cups, one for each teat of the corresponding cow to be milked. The teat cup carrier 15 would be adapted to hold the four teat cups in pairs for alignment with the teats of a cow.

Each teat cup 16 comprises a cup 17 within which a milk liner 19 is sealably located. The milk liner 19 defines an open mouth 18 for accommodating the teat of the animal into the milk liner 19. Such teat cups as the teat cups 16 will be well known to those skilled in the art, and further description should not be required. For convenience, the open mouth 18 to each milk liner 19 will hereinafter be referred to as the open mouth 18 of the corresponding teat cup 16.

The teat cup carrier 15 of each apparatus 10 is pivotal between a first state illustrated in FIG. 7 in which the teat cups 16 extend substantially horizontally, and in which the teat cups may be held in a protected state as will be described below; and a second state illustrated in FIG. 17 with the teat cups 16 in a ready state oriented substantially vertically with respective open mouths 18 of the teat cups 16 facing upwardly ready for urging by hand from the teat cup carrier 15 into engagement with the teats of the corresponding one of the animals 4. The teat cup carrier 15 is also pivotal from the first state to a third state illustrated in FIG. 11 with the teat cups 16 oriented in a flushing state inclined downwardly towards the respective open mouths 18 thereof for facilitating back flushing of the teat cups 16 between removal of the teat cups 16 from the teats of one animal and attaching of the teat cups 16 to the teats of the next animal to be milked.

The teat cup carrier 15 of each apparatus 10 comprises a pair of teat cup accommodating openings 33 for releasably engaging and holding the corresponding teat cups 16 in the teat cup carrier 15. Each teat cup accommodating opening 33 is also adapted to accommodate a continuous vacuum hose 34 and a pulsating vacuum hose 35 of the corresponding teat cup 16 therethrough, so that as the teat cups 16 are being urged upwardly from the teat cup carrier 15 to the teats of the animal, the vacuum hoses 34 and 35 are drawn through the teat cup accommodating openings 33.

A communicating opening 20 formed in the platform 11 of each apparatus 10 and extending through the corresponding platform 11 and the corresponding support plate 12 provides access to the corresponding teat cup carrier 15, and in turn to the teat cups 16, and accommodates the teat cups 16 therethrough for attaching to the teats of the animal 4. The communicating openings 20 of the respective apparatus 10 are located towards but spaced apart from the circumferential periphery 6 of the platform 2, so that when an animal is standing on the corresponding platform 10 in a position ready to be milked in the animal accommodating location 3, the communicating opening 20 is substantially aligned with and beneath the udder of the animal. Each communicating opening 20 is of rectangular shape and is defined by a pair of side edges 21 extending substantially parallel to the centre line 13 of the corresponding platform 11, and by an inner end edge 22 and an outer end edge 23. The centre line 13 extends centrally through the communicating opening 20 and bisects the communicating opening 20.

A closure element, in this case provided by a pair of closure plates 25 closes the communicating opening 20 of each apparatus 10 for facilitating passage of an animal 4 into and out of the corresponding animal accommodating location 3. Each closure plate 25 is hingedly coupled to the platform 11 adjacent the corresponding side edge 21 of the communicating opening 20, and the closure plates 25 are hingeable upwardly from a closed state closing the communicating opening 20 illustrated in three of the animal accommodating locations 3 of the rotary milking platform 1 of FIG. 1 and also illustrated in FIG. 3, to an open state illustrated in one of the animal accommodating locations 3 of the rotary milking platform 1 of FIG. 1 and also illustrated in FIG. 12. The closure plates 25 of each apparatus 10 extend from the respective side edges 21 towards each other in the closed state and meet along the corresponding centre line 13. Additionally, the closure plates 25 act as a separating means for separating the hind legs of an animal 4 in the corresponding animal accommodating location 3 as the closure plates 25 are pivoting from the closed state to the open state to assist in aligning the udder of the animal over the teat cup carrier 15. In the open state the closure plates 25 retain the hind legs of the animal spaced apart as illustrated in FIG. 1 for facilitating attaching the teat cups 16 to the teats of the corresponding animal.

The support plate 12 and the end walls 9 of each apparatus 10 are of steel plate material. The four mounting brackets 27 are of steel and are welded to the support plate 12. Two of the mounting brackets 27 are located on one side of the carriage 14 and two of the mounting brackets 27 are located on the other side of the carriage 14. The mounting brackets 27 slideably engage corresponding engagement grooves 28 on respective opposite sides of the carriage 14, and the mounting brackets 27 are located on the support plate 12 for guiding the carriage 14 to move with rectilinear motion in the general radial direction in the directions of the arrows A and B relative to the rotary milking platform 1 and substantially parallel to the centre line 13 defined by the corresponding platform 11.

Figure 24:
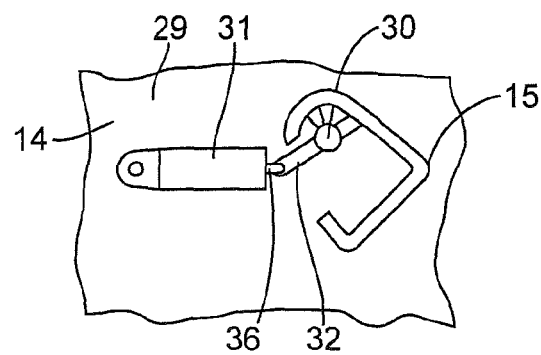
FIG. 24 is a side elevational view of a detail of the apparatus of FIG. 1, and FIGS. 25(a) and (b) are schematic end elevational views of another detail of the apparatus of FIG. 1.
Figure 25A:
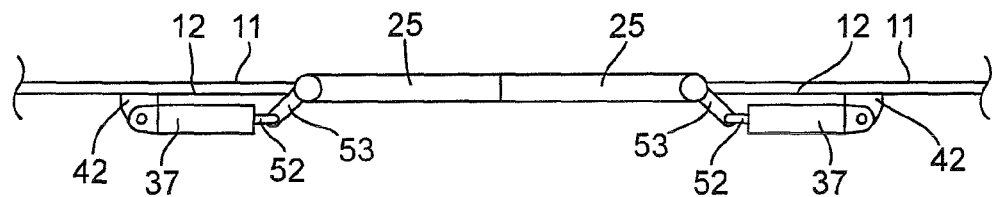
Figure 25B:
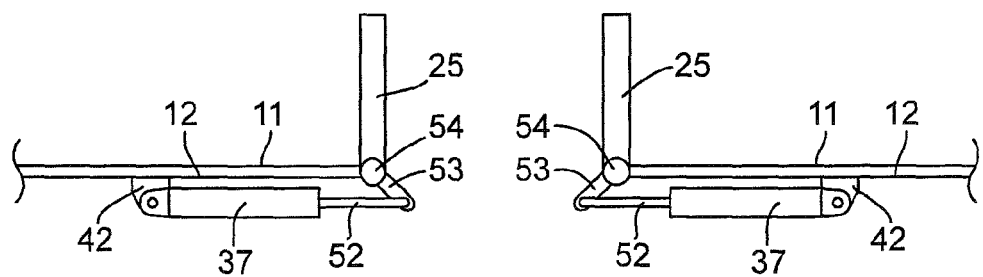

A pair of spaced apart side members 29 of the carriage 14 of each apparatus 10 pivotally carry a pivot shaft 30 to which the teat cup carrier 15 is rigidly mounted. A first drive means provided by a first pneumatic ram 31 operably coupled between the carriage 14 and the pivot shaft 30 pivots the teat cup carrier 15 between the first, second and third states, see FIG. 24. The first pneumatic ram 31 is pivotally coupled to one of the side members 29 of the carriage 14, and a piston rod 36 extending from the first ram 31 is pivotally coupled to a link arm 32 which extends radially and rigidly from the pivot shaft 30. The first ram 31 is illustrated in FIG. 24 only.

A second drive means comprising a pair of second pneumatic rams 37 operably coupled between the support plate 12 and the corresponding ones of the closure plates 25 pivot the closure plates 25 from the closed state to the open state. The second rams 37 are only illustrated in FIGS. 25(*a*) and (*b*) and are illustrated diagrammatically relative to the closure plates 25. Each second ram 37 is a single acting ram with an inbuilt spring return, and is coupled between the support plate 12 and the corresponding closure plate 25 so that the closure plate 25 is returned by the return spring action. Each ram 37 is pivotally coupled to the support plate 12 by a coupling bracket 42. A piston rod 52 extending from each second ram 37 is pivotally coupled to a link member 53 which extends radially and rigidly from a corresponding pivot shaft 54. The pivot shafts 54 are pivotally mounted on the support plate 12, and carry the respective corresponding closure plates 25, which extend rigidly from the corresponding pivot shafts 54, so that the closure plates 25 are hingedly coupled to the support plate 12. As the piston rods 52 extend from the second rams 37 under the action of the pneumatic power supply, the closure plates 25 are urged from the closed state to the open state. Retraction of the piston rods 52 into the second rams 37 under the action of the return springs (not shown) therein urges the closure plates 25 from the open state to the closed state.

Thus, the closure plates 25 are spring returned from the open state to the closed state by the spring return of the second rams 37 by exhausting the pneumatic power supply from the second rams 37. This avoids any danger of injury to the animal's hind legs during pivoting of the closure plates 25 from the open state to the closed state in the event of an animal's hind leg or legs becoming located or caught between the closure plates 25, since the animal could withdraw its hind leg or legs from the closure plates 25 against the spring urging of the closure plates 25 from the open state to the closed state.

Figure 7:
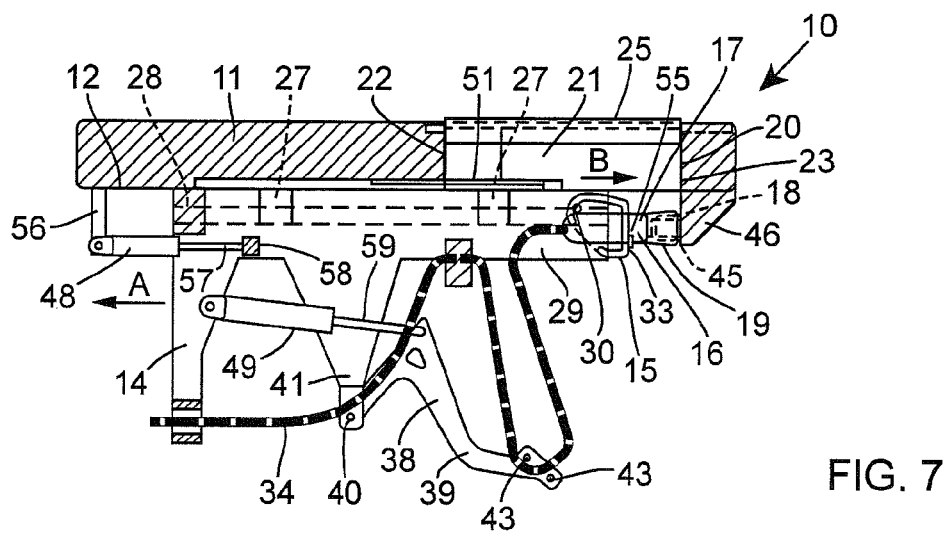
FIG. 7 is a transverse cross-sectional side elevational view of the apparatus of FIG. 2 on the line VII-VII of FIG. 4.
Figure 14:
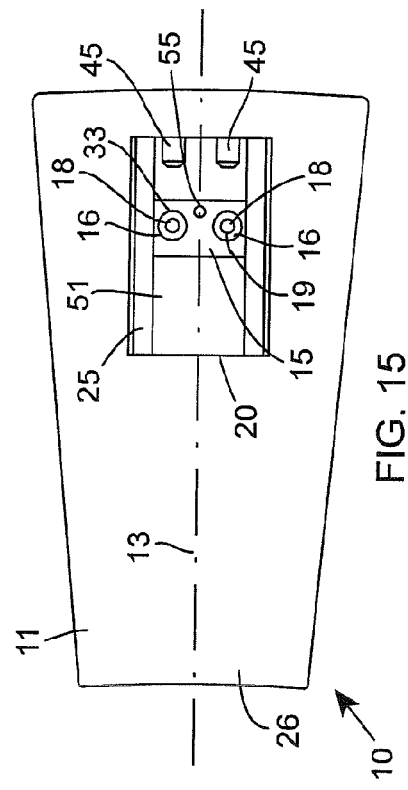
FIG. 14 is a top perspective view of the apparatus of FIG. 2 in a different state to that of FIG. 2.

A pair of spaced apart closure means, namely, plug elements 45 are mounted on a support member 46 extending downwardly from the support plate 12 of each apparatus 10 adjacent the outer edge 23 of the communicating opening 20 for sealably engaging and closing the open mouths 18 of the corresponding teat cups 16 when the teat cup carrier 15 is in the first state with the teat cups 16 in the protected state, see FIG. 7. In this embodiment of the invention each plug element 45 comprises a jetter 47 for facilitating washing and rinsing of the respective teat cups 16, and in turn the continuous vacuum hose 34 during washing and rinsing of the milking system to which the teat cups 16 and the vacuum hoses 34 and 35 are connected.

As mentioned above, the carriage 14 of each apparatus 10 is slideable with rectilinear motion on the mounting brackets 27 in a radial direction relative to the rotary platform 1 in the direction of the arrows A and B. A third drive means, in this embodiment of the invention a double acting third pneumatic ram 48 which is operably coupled between the support plate 12 and the carriage 14 urges the carriage 14 between a first position illustrated in FIG. 7 with the teat cup carrier 15 in an engaged position with the plug elements 45 sealably engaged in the open mouths 18 of the corresponding teat cups 16, and a second position illustrated in FIG. 9 with the teat cup carrier 15 in a disengaged position whereby the teat cups 16 are disengaged from the plug elements 45 for facilitating pivoting of the teat cup carriers 15 between the first, second and third states. When the carriage 14 is in the second position and the teat cup carrier 15 is in the second state with the teat cups 16 in the ready state, a portion of the teat cups 16 adjacent the open mouths 18 thereof extend through the communicating opening 20 in the corresponding platform 11 and above the upwardly facing major surface 26 of the platform 11 to facilitate gripping of the teat cups 16 by and for manually engaging the teat cups 16 with the teats of animal. Additionally, when the carriage 14 is in the second position and the teat cup carrier 16 is in the second state with the teat cups 16 in the ready state, the teat cup carrier 15 and the teat cups 16 are aligned with and located beneath the udder of the animal standing on the platform 11 to be milked in the corresponding animal accommodating location 3. The third ram 48 is illustrated in FIG. 7 only. The third ram 48 is coupled to the support plate 12 by a downwardly extending mounting bracket 56 which extends downwardly from the support plate 12. A piston rod 57 extends from the third ram 48 and is coupled to a transverse member 58 extending between the side members 29 of the carriage 14.

An urging means comprising an urging arm 38 engageable with the vacuum hoses 34 and 35 is pivotally coupled to the carriage 14 of each apparatus 10 for urging the hoses 34 and 35 downwardly through the communicating opening 20 and through the teat cup accommodating openings 33 of the teat cup carrier 15 when the teat cup carrier 15 is in the second state, for in turn removing the teat cups 16 from the teats of the animal on completion of milking, and returning the teat cups 16 to the teat cup carrier 15, and into engagement with the teat accommodating openings 33 therein. The urging arm 38 of each apparatus 10 comprises a pair of spaced apart arms 39 fast on a pivot shaft 40 extending between and pivotally mounted in side mounting brackets 41 of the carriage 14. A pair of spaced apart rollers 43 extending between and rotatably mounted on the arms 39 adjacent the distal ends thereof rollably engage the vacuum hoses 34 and 35.

Figure 16:
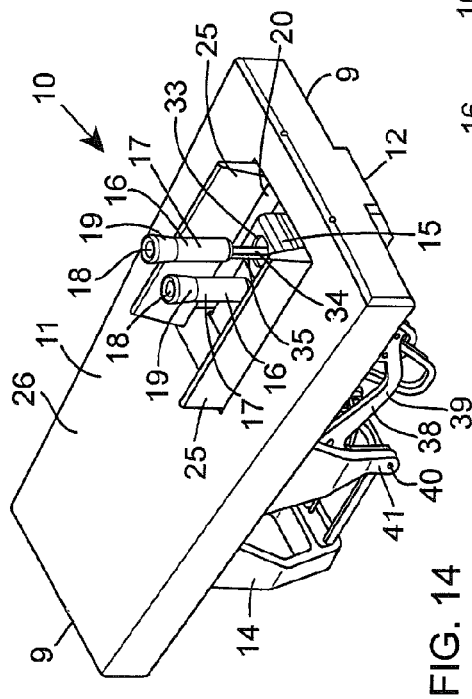
FIG. 16 is a view similar to FIG. 7 of the apparatus of FIG. 2 in the state of FIG. 14.
Figure 17:
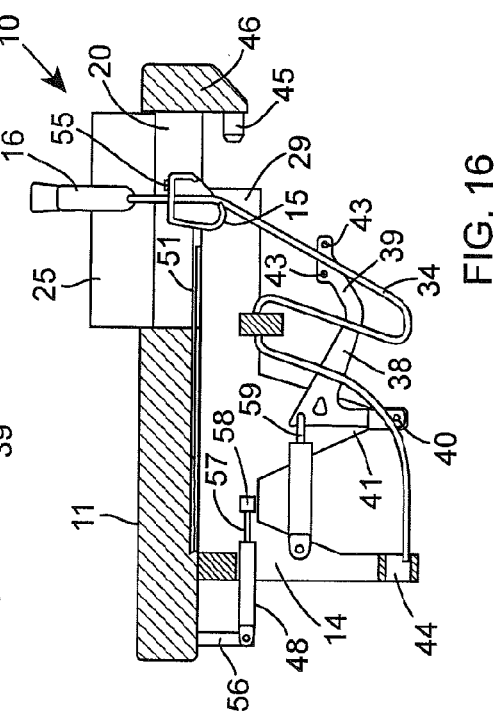
FIG. 17 is a view similar to FIG. 7 of the apparatus of FIG. 2 illustrating the apparatus in a further different state to that of FIG. 2.
Figure 22:
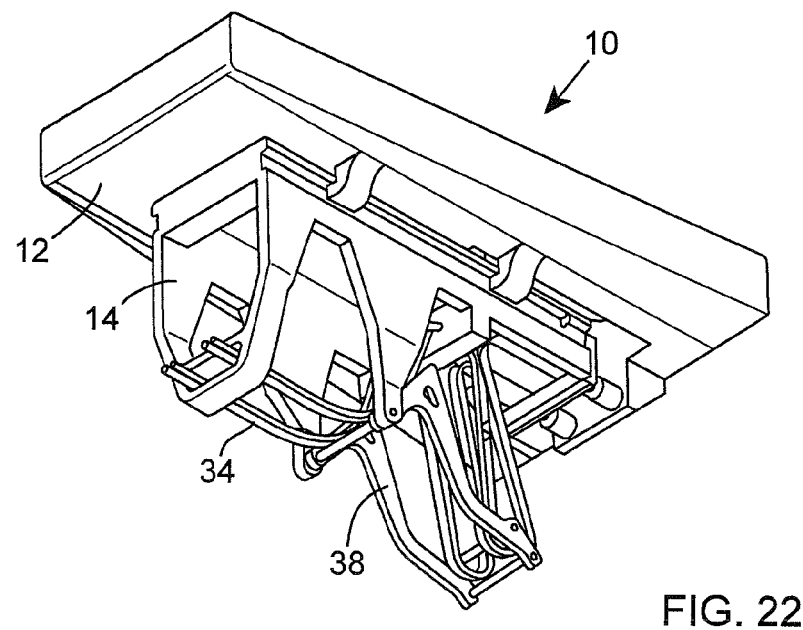
FIG. 22 is an underneath perspective view of the apparatus of FIG. 2 illustrating the apparatus in a different state to that of FIG. 2.
Figure 23:
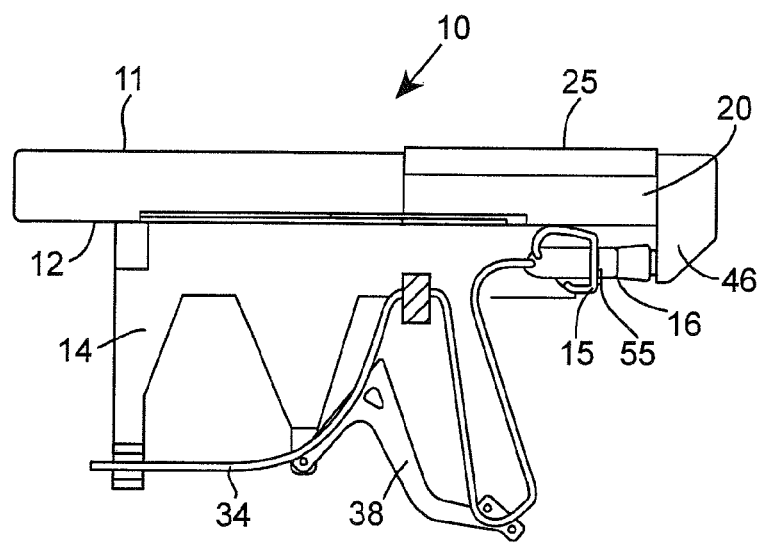
FIG. 23 is a view similar to FIG. 7 of the apparatus of FIG. 2 in the state of FIG. 22.

A fourth drive means comprising a single acting fourth pneumatic ram 49 is operably coupled between the carriage 14 and one of the arms 39 for urging the urging arm 38 downwardly from a first state illustrated in FIG. 16 to a second state illustrated in FIGS. 7 and 17 for urging the teat cups 16 from the teats of the animals, for removal therefrom, and for returning the teat cups 16 into engagement with the teat cup carrier 15. The fourth ram 49 is operable by applying a pneumatic power supply thereto for urging the urging arm 38 from the first state to the second state and for holding the urging arm 38 in the second state to take up any slackness in the vacuum hoses 34 and 35 when the teat cups 16 have been returned to the teat cup carrier 15. Exhausting of the pneumatic power supply from the fourth ram 49 permits the teat cups 16 to be manually transferred from the teat cup carrier 15 to the teats of the animal. As the teat cups 16 are being urged from the teat cup carrier 15, once the pneumatic supply has been exhausted from the fourth ram 49, the action of the vacuum hoses 34 and 35 on the rollers 43 returns the urging arm 38 from the second state to the first state. In this embodiment of the invention the pneumatic power supply is exhausted from the fourth ram 49 as the first ram 31 is pivoting the teat cup carrier 15 from the first or third states to the second state. The fourth ram 49 remains in the exhaust state until milking has been completed, and then the pneumatic power supply is applied again to the fourth ram 49 for urging the urging arm 38 downwardly from the first state to the second state for removing the teat cups 16 from the teats of the animal and for returning the teat cups 16 to the teat cup carrier 15, and also for taking up any slack in the vacuum hoses 34 and 35. The fourth pneumatic ram 49, which is only illustrated in FIGS. 7 and 16, is pivotally coupled to one of the side members 29 of the carriage 14. A piston rod 59 extending from the fourth ram 49 is pivotally coupled to one of the arms 39 of the urging arm 38.

A guide opening 44 in the carriage 14 guides the vacuum line hoses 34 and 35 of the respective teat cups 16 into the carriage 14.

A protective plate 51 which is slideably mounted in the carriage 14 of each apparatus 10 is urgeable by a fifth drive means, namely, a double acting fifth pneumatic ram (not shown), from a withdrawn state located within the carriage 14 clear of the communicating opening 20 to a protective state, illustrated in FIG. 16 whereby the protective plate 51 extends into the communicating opening 20 to the teat cup carrier 15 in order to support an animal's hind legs in the event of an animal placing one of its hind legs in the communicating opening 20.

A spray nozzle 55 located on the teat cup carrier 15 of each apparatus 10 between the respective teat cup accommodating openings 33 directs a spray upwardly when the teat cup carrier 15 is in the second state for spraying a disinfectant or other medicaments or a water rinse upwardly onto the teats of the animal. Such a spray could be suitable for protecting the animal against mastitis. Additionally, the water rinse may be sprayed for rinsing the teats of the animal before or after milking.

Where it is desired to spray the teats of the animals with a disinfectant, medicament or rinse water, the spray nozzle 55 of each apparatus 10 is connected to a reservoir of the appropriate one of a disinfectant, medicament or water. An isolating valve (not shown) is provided for selectively communicating the nozzle 55 with a reservoir of the appropriate disinfectant, medicament or rinse water to be sprayed onto the teats of the animal. A pump (also not shown) is provided for pumping an appropriate metered amount of one of the disinfectant, medicament or rinse water from the reservoir to the nozzle 55.

Should it be desired to spray more than one of a disinfectant, medicament or rinse water, the spray nozzle 55 would be selectively connected through a manifold to the appropriate numbers of reservoirs of the desired disinfectant, medicament and/or rinse water. Alternatively, instead of connecting a single spray nozzle 55 through a manifold to a number of reservoirs containing different ones of disinfectant, medicament and/or rinse water, an appropriate number of spray nozzles 55 may be provided mounted on each teat cup carrier 15, and each nozzle would be connected to a corresponding one of the reservoirs of the one of the disinfectant, medicament and/or rinse water, as the case may be.

A programmable microcontroller (not shown) is provided in each apparatus 10 for operating the respective first, second, third, fourth and fifth pneumatic rams in the appropriate sequence for initially presenting the teat cups 16 for attaching to the teat of an animal, and on completion of milking of the animal for removing the teat cups 16 from the animal. The sequence of operation of the respective pneumatic rams is described in more detail below.

Sensors (not shown) are provided at appropriate locations in each animal accommodating location 3 for detecting the presence of an animal in the animal accommodating location 3. Sensors (not shown) are also provided in the continuous vacuum hose 34 for detecting completion of milking of the animal. The microcontroller of each apparatus 10 is programmed to be responsive initially to the sensors in the corresponding animal accommodating location 3 detecting the presence of an animal on the platform 11 and positioned ready for milking for operating the second rams 37 for in turn pivoting the closure plates 25 from the closed state to the open state, and for operating the third ram 48 to urge the carriage 14 from the first position to the second position to disengage the teat cups 16 from the plug elements 45. The microcontroller is programmed to then operate the first ram 31 for in turn pivoting the teat cup carrier 15 from the first state into the second state with the teat cups 16 in the ready state ready for manual urging upwardly and attaching to the teats of the animal. Simultaneously with operating the first ram 31 to pivot the teat cup carrier 15 from the second to the first states, the microcontroller exhausts the pneumatic power supply from the fourth ram 49, thereby permitting the teat cups 16 to be manually transferred from the teat cup carrier 15 to the teats of the animal. The microcontroller is also programmed to operate the fifth ram (not shown) for urging the protective plate 51 from the withdrawn state to the protective state after the first ram 31 has operated the teat cup carrier 15 into the second state. The microcontroller of each apparatus is also programmed to be responsive to the sensor (not shown) in the corresponding continuous vacuum hoses 34 detecting completion of milking of the animal for applying the pneumatic power supply to the fourth ram 49 for in turn pivoting the urging arm 38 downwardly from the first state to the second state for removing the teat cups 16 from the teats of the animal and returning the teat cups 16 into engagement with the teat cup carrier 15 and also for taking up any slack in the vacuum hoses 34 and 35.

The isolating valve (not shown) and the pump (also not shown) through which the nozzle 55 of each apparatus 10 is coupled to the reservoir are operated under the control of the microcontroller of the apparatus 10 at appropriate times, typically when the teat cup carrier 15 is in the second state with the teat cups 16 in the ready state and prior to the teat cups being attached to the teats of the animal, and/or when the teat cup carrier 15 is in the second state after the teat cups 16 have been removed from the teats of the animal.

The operating sequence of each apparatus 10 will now be described with reference to the use of the rotary platform 1. The vacuum hoses 34 and 35 of the teat cups of the respective apparatus 10 are connected to a conventional milking system and the spray nozzles 55 of the respective apparatus 10 are connected through the isolating valves and the pumps to the reservoir of the appropriate one of the disinfectant, medicament or rinse water.

Initially, on commencement of a milking session, the carriage 14 of each apparatus is in the first position, and the teat cup carrier 15 is in the first state with the teat cups 16 sealably engaged in the plug elements 45. The closure plates 25 are in the closed state, and the protective plate 51 is in the withdrawn state. On the sensors (not shown) detecting the presence of an animal in one of the animal accommodating locations 3 in a position ready to be milked, the microcontroller operates the second rams 37 for pivoting the closure plates 25 from the closed state to the open state. As the closure plates 25 are being operated into the open state, the hind legs of the animal are urged apart and the animal is centred on the platform 11 with the udder of the animal substantially aligned over the teat cup carrier 15. Simultaneously, the microcontroller operates the third ram 48 to urge the carriage 14 from the first position to the second position with the teat cups 16 disengaged from the plug elements 45. The first ram 31 is then operated by the microcontroller for pivoting the teat cup carrier 15 from the first state to the second state with the teat cups 16 in the ready state extending substantially vertically with the open mouths 18 thereof facing upwardly, and portions of the respective teat cups 16 adjacent the open mouths 18 thereof extending through the communicating opening 20. The pneumatic power supply is exhausted from the fourth ram 49 under the control of the microcontroller in order that the urging arm 38 can be freely urged upwardly from the second state to the first state as the teat cups 16 are urged upwardly from the teat cup carrier 15 for attaching to the teats of the animal. The protective plate 51 is then urged in a radially outward direction from the withdrawn state to the protective state to the teat cup carrier 15 by the fifth pneumatic ram (not shown) under the control of the microcontroller. The teat cups 16 are then gripped by hand and manually urged upwardly and attached to the teats of the animal.

On the sensors in the continuous vacuum hose 34 of each apparatus 10 detecting completion of milking, the microcontroller operates the fourth ram 49 in order to urge the urging arm 38 downwardly from the first state to the second state for removing the teat cups 16 from the teats of the animal and for returning the teat cups 16 into engagement with the teat cup carrier 15. With the teat cups 16 engaged in the teat cup carrier 15, the first ram 31 is operated under the control of the microcontroller for urging the teat cup carrier 15 from the second state through the first state and into the third state for back flushing of the teat cups 16. The pneumatic power supply is then isolated and exhausted from the second pneumatic rams 37 by the microcontroller and the return springs of the second pneumatic rams 37 return the closure plates 25 to the closed state. The animal then exits the platform 11. The fifth ram (not shown) is operated for returning the protective plate 51 from the protective state to the withdrawn state.

The next animal to be milked then enters the corresponding animal accommodating location 3 on the platform 11 and the closure plates 25 are operated into the open state as already described. The first ram 31 is operated for operating the teat cup carrier 15 from the third state through the first state and into the second state with the teat cups 16 in the ready state, and so the next animal is milked.

During the periods while the teat cup carrier 15 is in the third state, the teat cups are back flushed.

If the teats of the animal are to be sprayed prior to milking, when the teat cup carrier 15 is operated into the second state the isolating valve which isolates the spray nozzle 55 from the reservoir is operated into the open state and the pump is operated for spraying the teats of the animal through the nozzle with a disinfectant, medicament or rinse water, depending on the contents of the reservoir to which the nozzle 55 is coupled. On completion of spraying, the pump is deactivated and the isolating valve is operated into the closed state. The teat cups 16 are then manually urged from the teat cup carrier 15 and attached to the teats of the animal.

On completion of milking when the teat cups 16 have been returned to the teat cup carrier 15, and while the teat cup carrier 15 is still in the second state, if desired, the isolating valve which isolates the nozzle 55 from the reservoir and the pump may again be operated to spray the teats of the animal.

Thereafter operation of the apparatus continues as already described until milking of the last animal to be milked in each animal accommodating location has been completed.

On completion of milking of the last animal to be milked during a milking session in each of the animal accommodating locations 3, the urging arm 38 of each apparatus 10 is urged downwardly from the first state to the second state for removing the teat cups 16 from the teats of the animal and for returning the teat cups 16 to the teat cup carrier 15. If the teats of the animal are to be sprayed on completion of milking of the last of the animals to be milked, the isolating valve and the pump are again activated for spraying the teats of the animal through the spray nozzle 55. The first ram 31 is then operated under the control of the microcontroller for urging the teat cup carrier 15 from the second state into the first state. The microcontroller then operates the third ram 48 for urging the carriage 14 in the direction of the arrow B from the second state to the first state for sealably engaging the teat cups 16 with the corresponding plug elements 45. The closure plates 25 are operated into the closed state and the animal exits the platform 11. At this stage, since the milking session is completed, the milking system is operated to wash and rinse the system, and the jetters 47 in the plug elements 45 complete the washing and rinsing circuit through the teat cups 16.

Sensors may also be provided in the animal accommodating location 3 of each apparatus 10 for detecting the position of the teats of the animal. Where such sensors are provided, the microcontroller would be programmed to operate the third ram 48 for urging the carriage 14 and in turn the teat cup carrier 15 into an aligned position with the teat cups 16 aligned directly beneath the teats of the animal in the animal accommodating location 3. Accordingly, while the teat cup carrier 15 is being pivoted from the first to the second state, the carriage 14 would be operated in the appropriate direction of the arrow A or B for aligning the teat cups 16 beneath the teats of the animal.

The advantages of the invention are many. By virtue of the fact that the teat cups are positioned by the teat cup carrier beneath the animal, and in general will be positioned beneath the animal in substantial alignment with the teats of the animal, and are oriented into a vertical ready state with the open mouths 18 thereof facing upwardly, the teat cups can be readily urged by hand from the teat cup carrier and attached to the teats of the animal. Accordingly, the time required to attach the teat cups to the teats of an animal is significantly reduced. By virtue of the fact that the urging arm 38 is operated on completion of milking of the animal to remove the teat cups 16 from the teats of the animal and to return the teat cups 16 to the teat cup carrier 15, the time required for removal of the teat cups from the animal is further significantly reduced, and thus, the overall time required for attaching the teat cups to the animal and removing the teat cups from the animal is significantly reduced, thus allowing the rotary milking platform to be operated at a higher speed, and thus further increasing the efficiency of milking using the rotary milking platform 1. Additionally, operator time required during milking is reduced.

The provision of the spray nozzle on the teat cup carrier for spraying the teat of an animal with a disinfectant or other medicament or rinse water provides more accurate application and significantly better coverage of the teats with the disinfectant, medicament or rinse water than can be achieved heretofore, and further, reduces the time required to spray the animal's teats, which heretofore is carried out manually and is dependent on an operator being present at the appropriate time for spraying.

By providing the teat cup carrier to be operable in the third state, the teat cups may be back flushed between applications from one animal to the next. By providing the plug elements for sealably closing the teat cups when not in use, there is no danger of foreign matter entering the milk liners of the teat cups. By configuring the plug elements as jetters when milking has been completed, the milking system, of which the teat cups 16 are a part, can be readily subjected to a wash and rinse cycle.

The provision of the closure plates 25 maintains the apparatus protected as the animals enter and exit the corresponding animal accommodating locations. Additionally, by operating the closure plates into the closed state by the return springs of the second rams 37, there is no danger of damage or injury to a hind leg or hind legs of an animal which may extend into the communicating opening 20.

A further advantage of configuring the closure plates to act as a spreading means for spreading the hind legs of an animal as the closure plates are being opened upwardly is that as well as spreading the hind legs of the animal apart, the closure plates 25 also act to centre the animal relative to the apparatus 10 along the centre line 13 thereof, and in turn centre the udder of the animal over the teat cup carrier, thereby facilitating rapid attaching of the teat cups to the teats of the animal.

A particularly important advantage of the invention is achieved by virtue of the fact that the apparatus 10 is located beneath the platform on which the animals stand during milking. By locating the apparatus beneath the platform, the teat cups are concealed beneath the platform by the closure plates 25, and thus, there is no need for any external equipment to be located which could otherwise be damaged by an animal entering or exiting the animal accommodating locations or even while the animal is in the animal accommodating location.

It is envisaged that the apparatus 10 according to the invention may be adapted for automatically applying the teat cups to the teats of the animal. In which case, it is envisaged that an additional mechanism would be provided for gripping the teat cups and urging the teat cups upwardly from the teat cup carrier of each apparatus to engage the teats of the corresponding animal. Such a mechanism could also be adapted for engaging and removing the teat cups from the animal on completion of milking, instead of or in conjunction with the urging arm 38. Suitable monitoring and sensing means would be provided for identifying the locations of the teats of the animal, and the third pneumatic ram for urging the carriage in the directions of the arrows A and B would be responsive to such monitoring and sensing means for aligning the teat cup carrier and in turn the teat cups with the teats of the animals along the centre line 13 defined by the platform. The mechanism for urging the teat cups upwardly from the teat cup carriers would then be operated to make any other fine adjustments for aligning the teat cups with the teats of the animal, so that the teat cups when aligned with the teats of the animal would then be urged by the mechanism into engagement with the teats of the animal. During engagement of the teat cups with the teats of the animal, the vacuum on the continuous vacuum hoses 34 would be applied for drawing the teats of the animal into the teat cups. The monitoring and sensing means for locating the positions of the teats of the animal could be any suitable monitoring and sensing means such as visual, for example, by an imaging means, such as a camera, tactile, for example, by touch sensors and the like.

While the apparatus according to the invention has been described for use on a rotary milking platform of a rotary milking parlour, it will be appreciated that the apparatus according to the invention may be used in any type of milking parlour, such as an in-line milking parlour whereby the animal accommodating locations are parallel to each other and side by side with each other.

It will also be appreciated that while the apparatus has been described for presenting two teat cups for attaching to the teats of a goat, the apparatus may be adapted for presenting any number of teat cups for attachment to the teats of any animal. Where the apparatus is adapted for presenting teat cups for attaching to the teats of a cow, the teat cup carrier will be adapted for carrying four teat cups instead of two. Indeed, in certain cases, it is envisaged that where the apparatus is adapted for presenting teat cups for attaching to the teats of a cow, a pair of teat cup carrier may be provided whereby each teat cup carrier would carry two teat cups.

While the communicating opening 20 has been described as being of rectangular shape, the communicating opening may be of any suitable or desired shape, and in certain cases, it is envisaged that the side edges of the communicating opening may not be parallel to each other, and may extend in a direction converging inwardly towards each other in a direction towards the centre of the rotary platform or towards the centre line 13. Needless to say, the communicating openings 20 may be of any other desired shape.

While each apparatus has been described as comprising its own programmable microcontroller, it is envisaged in certain cases that a single programmable microcontroller or a single microprocessor may be provided for controlling and operating the respective apparatus of the rotary milking platform. Needless to say, instead of each apparatus being controlled by a microcontroller, each apparatus may be controlled by a microprocessor.

It is also envisaged that more than one spray nozzle 55 may be provided on each teat cup carrier 15, and this would permit different disinfectants, medicaments or water to be sprayed onto the animal's teats, for example, one nozzle may be provided for spraying an anti-mastitis disinfectant onto the teats of the animal prior to milking, and another of the spray nozzles may be provided for spraying rinse water onto the teats of the animal on completion of milking. It is also envisaged that the spray nozzle 55 or spray nozzles may be rigidly mounted on the carriage and directed in a generally upwardly direction. The nozzle or nozzles would be mounted on the carriage in a location so that when the teat cup carrier is aligned with the teats, the spray nozzles would direct the disinfectant, medicament or rinse water directly to the teats of the animal. Each spray nozzle would be connected to a corresponding reservoir.

While the protective plate 51 has been described as being moveable relative to the carriage 14, it is envisaged in certain cases that the protective plate 51 may be rigidly mounted on the carriage 14, and would extend to the corresponding teat cup carrier 15 when the teat cup carrier is in the second state and the carriage is in the second position.

While the first, second, third, fourth and fifth drive means have been described as being pneumatic rams, any other suitable drive means besides pneumatic rams may be provided. For example, where rotary motion is required, rotary motors, for example, pneumatically powered rotary motors may be provided. Alternatively, the pneumatic rams or rotary motors may be hydraulically powered. Alternatively, electrically powered linear motors may be used.

While the closure plates 25 have been described as being urged from the closed state to the open state by respective pneumatic rams, it is envisaged in certain cases that only one pneumatic ram may be provided for operating the closure plates from the closed state to the open state. In which case, it is envisaged that the pneumatic ram would be connected to the closure plates by suitable linkages. It is also envisaged that torsion springs may be provided for urging the closure plates from the open state into the closed state.

While the first drive means for urging the teat cup carrier 15 between the first, second and third states has been described as comprising one first pneumatic ram, it is envisaged that two pneumatic rams may be provided, one pneumatic ram would urge the teat cup carrier between the second and third states, and the other pneumatic ram would urge the teat cup carrier between the first and second states, and could also be operable for urging the teat cup carrier between the first and third states.

The invention claimed is:

1. Apparatus for presenting a teat cup for attaching to a teat of an animal to be milked, the apparatus comprising:

a support means adapted for mounting beneath an upwardly facing major surface of a platform on which an animal stands during milking thereof, a teat cup carrier for holding the teat cup, the teat cup carrier being mounted on the support means and being selectively operable in a first state for holding the teat cup in a protected state, and in a second state for holding the teat cup beneath the animal in a ready state with the teat cup ready to be urged upwardly from the teat cup carrier for attaching to the teat of the animal, and a closure means for closing the open mouth of the teat cup when the teat cup carrier is in the first state and the teat cup is in the protected state, one of the teat cup carrier and the closure means being moveable relative to the other one of the teat cup carrier and the closure means between an engaged position with the closure means engaged in the open mouth of the teat cup, and a disengaged position with the closure means disengaged from the teat cup.

2. Apparatus as claimed in claim 1 in which the teat cup carrier is adapted for holding the teat cup in the ready state with at least a portion of the teat cup extending above the upwardly facing major surface of the platform.

3. Apparatus as claimed in claim 1 in which the teat cup carrier is selectively operable in a third state with the teat cup in a flushing state for facilitating back flushing of the teat cup.

4. Apparatus as claimed in claim 3 in which the teat cup carrier is adapted to hold the teat cup in the flushing state inclined downwardly towards an open mouth of the teat cup when the teat cup carrier is in the third state.

5. Apparatus as claimed in claim 1 in which the closure means comprises a plug element for sealably engaging the open mouth of the teat cup.

6. Apparatus as claimed in claim 1 in which the teat cup carrier is moveable between the engaged position and the disengaged position.

7. Apparatus as claimed in claim 1 in which the teat cup carrier is mounted on a carriage which is mounted on the support means, the carriage being moveable relative to the support means between a first position with the teat cup carrier in the engaged position and a second position with the teat cup carrier in the disengaged position.

8. Apparatus as claimed in claim 7 in which the carriage is slideably mounted on the support means between the first and second positions.

9. Apparatus as claimed in claim 7 in which the teat cup carrier is moveably mounted on the carriage and is moveable relative to the carriage between the first, second and third states.

10. Apparatus as claimed in claim 7 in which the teat cup carrier is pivotally mounted on the carriage, and is pivotal between the first, second and third states.

11. Apparatus as claimed in claim 7 in which the teat cup is substantially aligned with a teat of an animal when the carriage is in the second position and the teat cup carrier is in the second state with the teat cup in the ready state.

12. A rotary milking platform defining a plurality of animal accommodating locations circumferentially disposed around the rotary platform, and one apparatus as claimed in claim 1 is provided in each animal accommodating location of the rotary platform, each apparatus being located beneath the rotary platform adjacent the corresponding animal accommodating location.

13. A rotary milking parlour comprising the apparatus as claimed in claim 1.

14. Apparatus as claimed in claim 1 in which the closure means is configured as a jetter for facilitating washing and/or rinsing of the teat cup.

15. Apparatus as claimed in claim 1 in which the teat cup carrier is adapted to hold the teat cup in the protected state with the teat cup extending substantially horizontally when the teat cup carrier is in the first state.

16. Apparatus for presenting a teat cup for attaching to a teat of an animal to be milked, the apparatus comprising:
   a platform defining an upwardly facing major surface for supporting an animal standing thereon during milking thereof,
   a support means mounted on the platform beneath the upwardly facing surface of the platform,
   a teat cup carrier for holding the teat cup, the teat cup carrier being mounted on the support means and being adapted for holding the teat cup beneath the animal in a ready state with the teat cup ready to be urged upwardly from the teat cup carrier for attaching to the teat of the animal,
   a communicating opening formed in the platform for accommodating the teat cup therethrough from the teat cup carrier, and
   a pair of closure elements coupled to the platform adjacent respective opposite side edges of the communicating opening, the closure elements being urgeable upwardly from a closed state closing the communicating opening to an open state providing access through the communicating opening to the teat cup,
   the closure elements forming a separating means for urging the hind legs of an animal standing on the platform apart as the closure elements are being urged from the closed state to the open state.

17. Apparatus as claimed in claim 16 in which the platform defines a centre line extending substantially in a forward/rearward direction corresponding to a forward/rearward direction of an animal standing on the platform during milking, the centre line bisecting the communicating opening, and the opposite side edges to which the closure elements are coupled extend substantially parallel to the centre line of the platform.

18. Apparatus as claimed in claim 16 in which the closure elements are hingedly coupled to the platform, and are hingeable between the closed state and the open state.

19. Apparatus as claimed in claim 16 in which the communicating opening is provided in the platform at a location which is substantially beneath an udder of an animal standing on the platform to be milked.

20. Apparatus as claimed in claim 16 in which the closure elements extend from the respective opposite side edges of the communicating opening towards each other in the closed state and meet adjacent the centre line of the platform.

21. A rotary milking platform defining a plurality of animal accommodating locations circumferentially disposed around the rotary platform, and one apparatus as claimed in claim 16 is provided in each animal accommodating location of the rotary platform, each apparatus being located beneath the rotary platform adjacent the corresponding animal accommodating location.

22. Apparatus for presenting a teat cup for attaching to a teat of an animal to be milked, the apparatus comprising:
   a support means adapted for mounting beneath an upwardly facing major surface of a platform on which an animal stands during milking thereof, and
   a teat cup carrier for holding the teat cup, the teat cup carrier being mounted on the support means and being selectively operable in a first state for holding the teat cup in a protected state, a second state for holding the teat cup beneath the animal in a ready state with the teat cup ready to be urged upwardly from the teat cup carrier for attaching to the teat of the animal, and a third state for holding the teat cup in a flushing state for facilitating back flushing of the teat cup.

23. Apparatus as claimed in claim 22 in which a spray nozzle is mounted on the teat cup carrier for spraying at least one teat of an animal, the spray nozzle being adapted to direct a spray at the teat of an animal when the teat cup carrier is in the second state.

24. Apparatus as claimed in claim 22 in which the teat cup carrier is adapted for holding the teat cup in the flushing state beneath the upwardly facing major surface of the platform.

25. Apparatus as claimed in claim 22 in which the teat cup carrier is adapted to hold the teat cup in the flushing state inclined downwardly towards an open mouth of the teat cup when the teat cup carrier is in the third state.

26. Apparatus as claimed in claim 22 in which the teat cup carrier is adapted to hold the teat cup in the ready state with the teat cup extending substantially vertically and with the open mouth of the teat cup facing generally upwardly when the teat cup carrier is in the second state.

27. Apparatus as claimed in claim 22 in which a first drive means is provided for operating the teat cup carrier between the first, second and third states.

28. A rotary milking platform defining a plurality of animal accommodating locations circumferentially disposed around the rotary platform, and one apparatus as claimed in claim 22 is provided in each animal accommodating location of the rotary platform, each apparatus being located beneath the rotary platform adjacent the corresponding animal accommodating location.

29. Apparatus for presenting a teat cup for attaching to a teat of an animal to be milked, the apparatus comprising:
   a support means adapted for mounting beneath an upwardly facing major surface of a platform on which an animal stands during milking thereof,
   a carriage mounted on the support means,
   a teat cup carrier for holding the teat cup, the teat cup carrier being mounted on the carriage and being adapted for holding the teat cup beneath the animal in a ready state with the teat cup ready to be urged upwardly from the teat cup carrier for attaching to the teat of the animal, the teat cup carrier being adapted to accommodate a vacuum hose therethrough extending from the teat cup, so that the vacuum hose can be pulled through the teat cup carrier when the teat cup is being urged from the teat cup carrier to an animal, and
   an urging means engageable with the vacuum hose extending from the teat cup, the urging means being pivotally mounted on the carriage and being pivotal from a first state to a second state for urging the vacuum hose through the teat cup carrier for in turn urging the teat cup from the teat of an animal.

30. Apparatus as claimed in claim 29 in which the urging means is adapted so that in the second state thereof the urging means takes up slack in the vacuum hose extending from the teat cup when the teat cup is engaged in the teat cup carrier.

31. A rotary milking platform defining a plurality of animal accommodating locations circumferentially disposed around the rotary platform, and one apparatus as claimed in claim 29 is provided in each animal accommodating location of the rotary platform, each apparatus being located beneath the rotary platform adjacent the corresponding animal accommodating location.

32. Apparatus for presenting a teat cup for attaching to a teat of an animal to be milked, the apparatus comprising:
- a support means adapted for mounting beneath an upwardly facing major surface of a platform on which an animal stands during milking thereof,
- a teat cup carrier for holding the teat cup, the teat cup carrier being mounted on the support means and being selectively operable in a first state for holding the teat cup in a protected state, and in a second state for holding the teat cup beneath the animal in a ready state with the teat cup ready to be urged upwardly from the teat cup carrier for attaching to the teat of the animal, and
- a closure means for closing the open mouth of the teat cup when the teat cup carrier is in the first state and the teat cup is in the protected state, the closure means comprises a plug element for sealably engaging the open mouth of the teat cup, and being configured as a jetter for facilitating washing and/or rinsing of the teat cup,
- one of the teat cup carrier and the closure means being moveable relative to the other one of the teat cup carrier and the closure means between an engaged position with the closure means engaged in the open mouth of the teat cup, and a disengaged position with the closure means disengaged from the teat cup.

33. A rotary milking platform defining a plurality of animal accommodating locations circumferentially disposed around the rotary platform, and one apparatus as claimed in claim 32 is provided in each animal accommodating location of the rotary platform, each apparatus being located beneath the rotary platform adjacent the corresponding animal accommodating location.

\* \* \* \* \*